United States Patent
Koizumi

(10) Patent No.: US 11,124,435 B2
(45) Date of Patent: Sep. 21, 2021

(54) ELECTROLYZED WATER GENERATION DEVICE

(71) Applicant: NIHON TRIM CO., LTD., Osaka (JP)

(72) Inventor: Yoshinobu Koizumi, Nankoku (JP)

(73) Assignee: NIHON TRIM CO., LTD., Osaka (JP)

( * ) Notice: Subject to any disclaimer, the term of this patent is extended or adjusted under 35 U.S.C. 154(b) by 339 days.

(21) Appl. No.: 16/319,007

(22) PCT Filed: Jul. 20, 2017

(86) PCT No.: PCT/JP2017/026256
§ 371 (c)(1),
(2) Date: Jan. 18, 2019

(87) PCT Pub. No.: WO2018/016575
PCT Pub. Date: Jan. 25, 2018

(65) Prior Publication Data
US 2019/0276341 A1    Sep. 12, 2019

(30) Foreign Application Priority Data
Jul. 21, 2016   (JP) .............................. JP2016-143627

(51) Int. Cl.
*C02F 1/461*   (2006.01)
*C02F 1/467*   (2006.01)
*C02F 1/46*    (2006.01)

(52) U.S. Cl.
CPC ............ *C02F 1/46104* (2013.01); *C02F 1/46* (2013.01); *C02F 1/4676* (2013.01); *C02F 2201/4613* (2013.01); *C02F 2201/46145* (2013.01)

(58) Field of Classification Search
CPC .......... C02F 1/46104; C02F 2201/4613; C02F 2201/46145
See application file for complete search history.

(56) References Cited

U.S. PATENT DOCUMENTS

| | | |
|---|---|---|
| 5,234,563 A | 8/1993 | Arai |
| 6,187,154 B1 | 2/2001 | Yamaguchi |
| 6,524,450 B1 | 2/2003 | Hara |

FOREIGN PATENT DOCUMENTS

| | | |
|---|---|---|
| JP | S59189871 U | 12/1984 |
| JP | H06335680 A | 12/1994 |

(Continued)

OTHER PUBLICATIONS

Office Action of EP corresponding application No. 17831091 dated Jan. 22, 2020.
International Search Report for PCT/JP2017/026256.

*Primary Examiner* — Nicholas A Smith
(74) *Attorney, Agent, or Firm* — Muncy, Geissler, Olds & Lowe, P.C.

(57) ABSTRACT

An electrolyzed water generation device is provided with a first flow passage delivering electrolyzed water generated in one of first polar chamber and second polar chamber of an electrolytic chamber, a second flow passage delivering electrolyzed water generated in the other one of the first polar chamber and second polar chamber, a double autochange crossline valve in which a flow rate regulating valve 74 and a flow passage switching valve 85 are interlocked, a polarity switching unit 51 switching the polarities of a first power feeder 41 and a second power feeder 42, and a determination unit 52 determining the switching timing of the polarity switching unit 51 and the flow passage switching valve 85. The determination unit 52 determines that the switching timing arrives when a predetermined time passes without detecting water supply to the electrolytic chamber after electrolysis is performed by a predetermined number of times or more in the electrolytic chamber without the polarities being switched.

9 Claims, 4 Drawing Sheets

(56) References Cited

FOREIGN PATENT DOCUMENTS

| | | | | |
|---|---|---|---|---|
| JP | 09234469 | A | * | 9/1997 |
| JP | H09234469 | A | | 9/1997 |
| JP | 2002-273426 | A | | 9/2002 |
| JP | 5639724 | B1 | | 12/2014 |
| JP | 2015174060 | A | * | 10/2015 |
| JP | 5809208 | B2 | | 11/2015 |
| TW | 500699 | B | | 9/2002 |
| TW | I383956 | B | | 2/2013 |

* cited by examiner

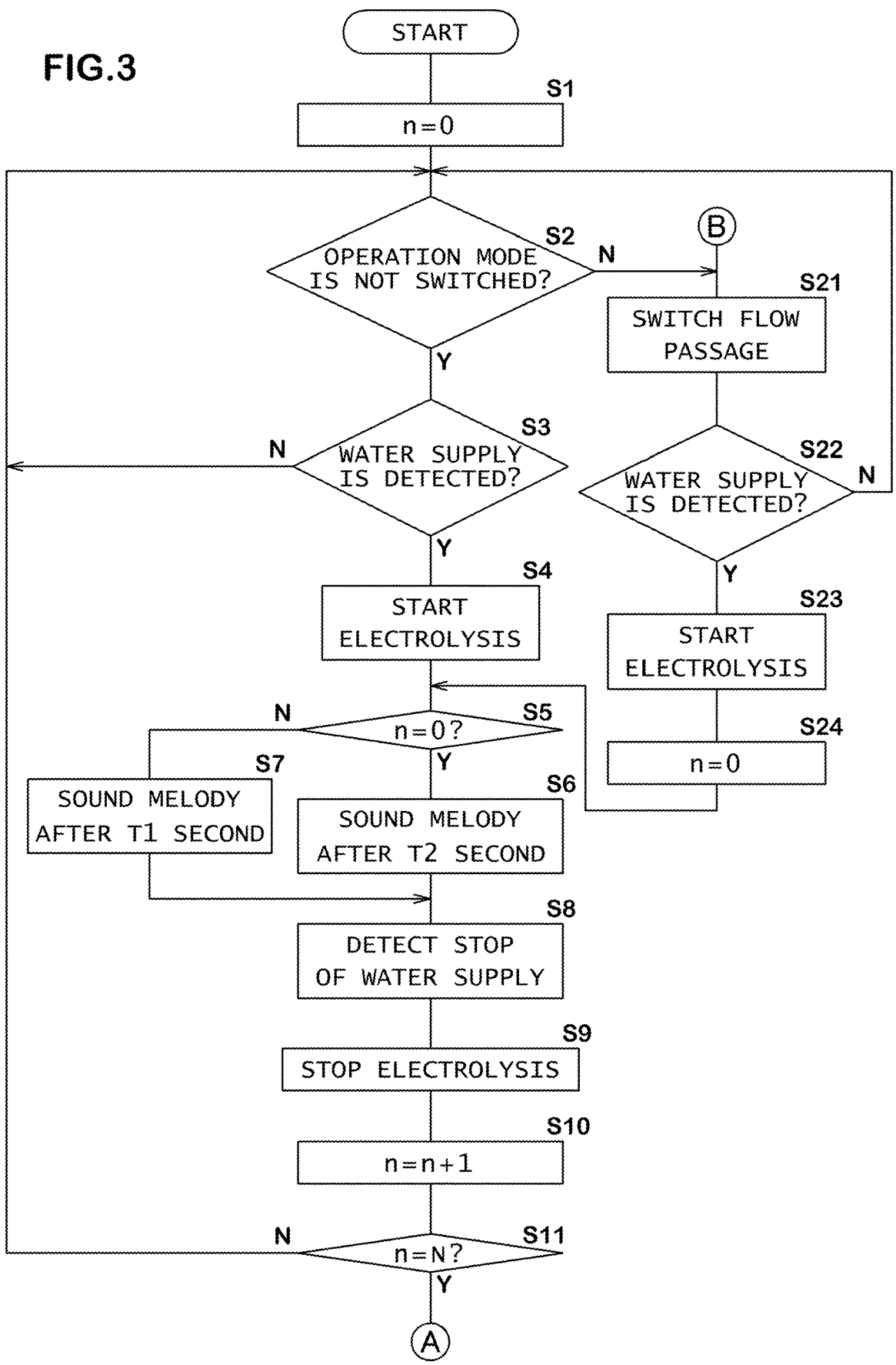

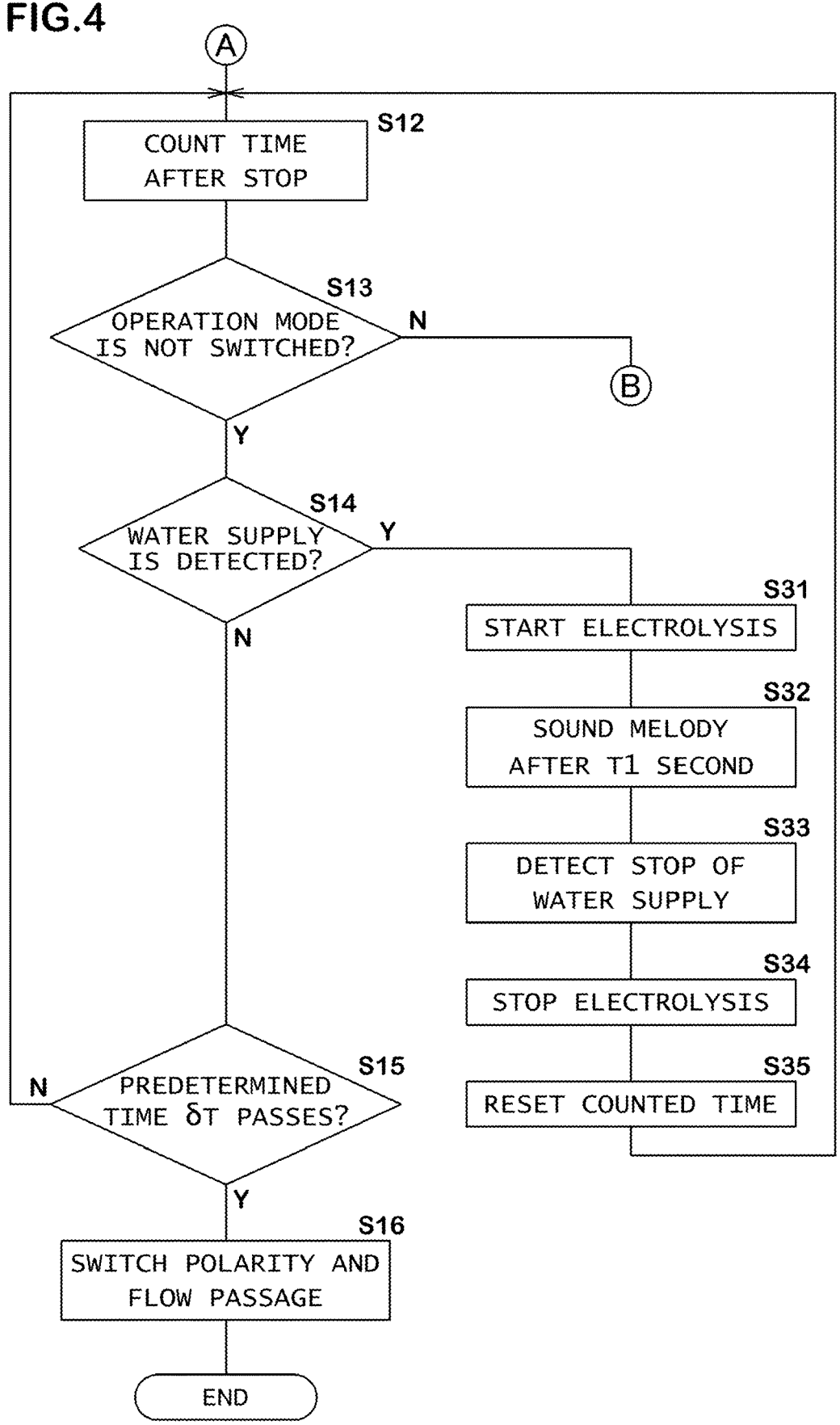

ELECTROLYZED WATER GENERATION DEVICE

TECHNICAL FIELD

The present invention relates to an electrolyzed water generation device for generating electrolyzed hydrogen water by electrolyzing water.

BACKGROUND ART

Heretofore, an electrolyzed water generation device is known which is provided with an electrolytic cell having an anode chamber and a cathode chamber which are divided with a membrane and which electrolyzes raw water, such as tap water, to be supplied to the electrolytic cell (for example, see Patent document 1). In the cathode chamber of the electrolyzed water generation device, electrolyzed hydrogen water (electrolyzed reduction water) in which hydrogen gas is melted is generated. In the electrolyzed water generation device, immediately after starting water discharge, water remaining in the electrolytic cell is discharged without being sufficiently electrolyzed in some cases. Therefore, it is desirable not to use water until predetermined time passes from the start of the water discharge (for example, for several seconds) passes.

PRIOR ART DOCUMENT

Patent Document

Patent document 1: JP-A No. 2002-273426

Meanwhile, metal ions, such as calcium ion and magnesium ion, are slightly contained in raw water to be electrolyzed by the electrolytic cell. These metal ions are hard to be removed with a filter and the like. When the metal ions enter the electrolytic cell, the metal ions are deposited as scale inside a cathode chamber including a power feeder or inside a flow passage connected to the downstream side of the cathode chamber.

When the scale adheres to the surface of the power feeder, water is hard to be electrolyzed, so that the dissolved hydrogen concentration of the electrolyzed hydrogen water decreases. Then, an electrolyzed water generation device has been proposed which is configured so that the adhesion of scale to power feeders arranged inside an electrolytic cell is suppressed by switching the polarities of the power feeders as appropriate after stopping electrolysis. In this type of electrolyzed water generation device, when the polarities of the power feeders are switched, the polarities are switched by operating a flow passage switching valve to synchronize upstream and downstream channels of the electrolytic cell, whereby electrolyzed water of the same type as that before the switching can be discharged from a water discharge port, so that an improvement of the usability is achieved.

However, in the electrolytic cell and the flow passage switching valve immediately after switching the polarities of the power feeders, electrolyzed water generated with a different polarity remains. Therefore in order to prevent the mixture of the electrolyzed water generated with a different polarity and obtain desired electrolyzed water, it is necessary to take water after the water is discharged from the water discharge port, and thus relevant waiting time arises. The waiting time until the electrolyzed water generated with a different polarity when the polarities of the power feeders are switched is discharged is longer than waiting time when not switching the polarity, and thus a further improvement has been demanded in order to improve the usability of the electrolyzed water generation device. Moreover, the water generated with a different polarity is put into disposal as discarded water, which is a cause of the impediment of effective use of water.

SUMMARY OF THE INVENTION

Problem to be Solved by the Invention

The present invention has been devised in view of the above-described circumstances. It is a main object of the present invention to provide an electrolyzed water generation device capable of improving the usability while suppressing the adhesion of scale to a power feeder and reducing discarded water.

Means for Solving the Problem

The present invention is an electrolyzed water generation device provided with an electrolytic chamber to which water to be electrolyzed is supplied, a first power feeder and a second power feeder disposed facing each other in the electrolytic chamber, and a membrane arranged between the first power feeder and the second power feeder and dividing the electrolytic chamber into a first polar chamber on the side of the first power feeder and a second polar chamber on the side of the second power feeder, and characterized in that the electrolyzed water generation device is further provided with a first flow passage delivering electrolyzed water generated in one of the first polar chamber and the second polar chamber to a first water discharge port, a second flow passage delivering electrolyzed water generated in the other one of the first polar chamber and the second polar chamber to a second water discharge port, a flow passage switching valve switching connections of the first polar chamber and the second polar chamber to the first flow passage and the second flow passage, a polarity switching unit switching the polarities of the first power feeder and the second power feeder, a determination unit determining switching timing of the polarity switching unit and the flow passage switching valve, and a water supply detection unit detecting water supply to the electrolytic chamber, and the determination unit determines that the switching timing arrives when a predetermined time passes without detecting water supply to the electrolytic chamber after electrolysis is performed by a predetermined number of times or more in the electrolytic chamber without the polarities being switched.

In the electrolyzed water generation device according to the present invention, it is preferable that the determination unit integrates electrolysis time in the electrolytic chamber and determines that the switching timing arrives when the time passes after the electrolysis is performed by the number of times or more in the electrolytic chamber without the polarities being switched and the integrated electrolysis time reaches a predetermined threshold value.

It is preferable that the electrolyzed water generation device according to the present invention is further provided with a current detection unit detecting a current to be supplied to the first power feeder and the second power feeder and the determination unit changes the number of times based on an integrated value of the currents after switching the polarity and the flow passage.

It is preferable that the determination unit changes the time based on the integrated value of the currents after switching the polarity and the flow passage in the electrolyzed water generation device according to the present invention.

It is preferable that the electrolyzed water generation device according to the present invention is further provided with a voltage detection unit detecting a voltage to be applied to the first power feeder and the second power feeder and the determination unit changes the number of times based on a ratio of the voltage to the current after switching the polarity and the flow passage.

It is preferable that the determination unit changes the time based on the ratio of the voltage to the current in the electrolyzed water generation device according to the present invention.

Effects of Invention

In the electrolyzed water generation device of the present invention, the determination unit determines that the switching timing arrives on the assumption that electrolysis is performed by a predetermined number of times or more in the electrolytic chamber without the polarities of the power feeders being switched. Thus, the adhesion of scale can be suppressed by managing the switching of the polarity based on the number of times in which the electrolysis is performed. Furthermore, in the present invention, the determination unit determines that the switching timing arrives when the predetermined time passes without detecting the water supply to the electrolytic chamber after the electrolysis is performed by the number of times or more. Therefore, the switching of the polarity is not performed when water is supplied to the electrolytic chamber several times for a short period of time during cooking, for example. Therefore, the occurrence frequency of a situation where the waiting time is prolonged in connection with the switching of the polarity decreases, and thus the usability of the electrolyzed water generation device is further increased.

BRIEF DESCRIPTION OF DRAWINGS

FIG. 3 a flow chart illustrating a processing procedure of a switching operation of the polarity and the flow passage in the electrolyzed water generation device of FIG. 2.

FIG. 4 a flow chart illustrating a processing procedure subsequent to the processing procedure of FIG. 3.

MODE FOR CARRYING OUT THE INVENTION

Hereinafter, one embodiment of the present invention is described based on the drawings.

Figure 1:
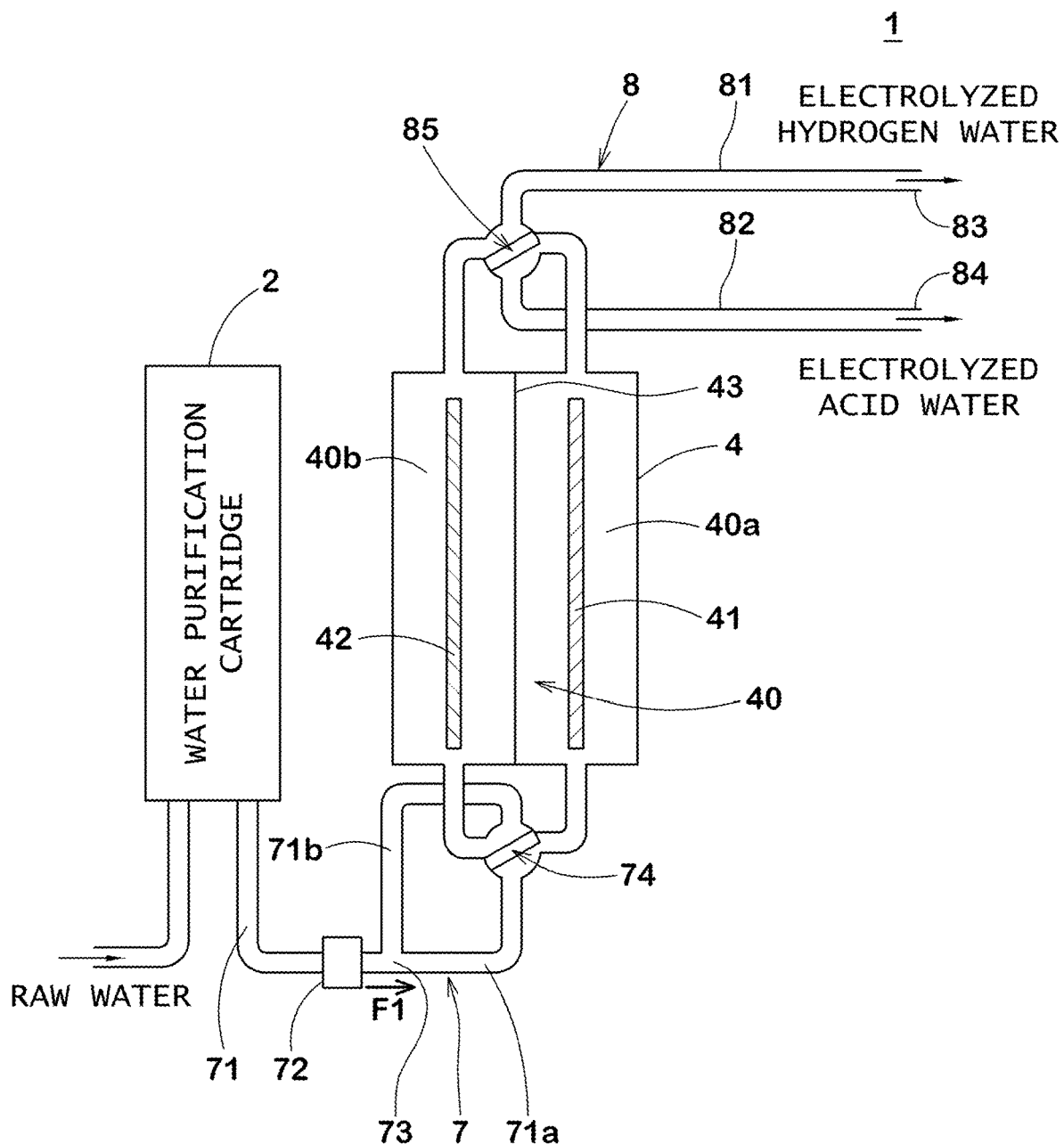
FIG. 1 a block diagram illustrating the flow passage configuration of one embodiment of an electrolyzed water generation device of the present invention.

FIG. 1 illustrates the schematic configuration of an electrolyzed water generation device 1 of this embodiment. In this embodiment, a home electrolyzed water generation device to be used for the generation of domestic drinking water is illustrated as the electrolyzed water generation device 1, for example. FIG. 1 illustrates the electrolyzed water generation device 1 in a state of generating electrolyzed hydrogen water for drinking.

The electrolyzed water generation device 1 is provided with a water purification cartridge 2 purifying water and an electrolytic cell 4 in which an electrolytic chamber 40 to which the purified water is supplied is formed.

The water purification cartridge 2 filters raw water supplied to the electrolyzed water generation device 1 to thereby generate purified water, and then supplies the same to the electrolytic chamber 40. For the raw water, tap water is generally used and, besides the tap water, well water, and groundwater are usable, for example. The water purification cartridge 2 is configured so as to be detachable and attachable to the device body of the electrolyzed water generation device 1. Thus, the water purification cartridge 2 which has reached the end of the service life due to use or the lapse of time can be exchanged for a new water purification cartridge 2.

The water purification cartridge 2 is provided on the upstream side of the electrolytic cell 4. Therefore, water purified by the water purification cartridge 2 is supplied to the electrolytic cell 4.

The water purified by the water purification cartridge 2 is electrolyzed in the electrolytic chamber 40. In the electrolytic chamber 40, there are provided a first power feeder 41 and a second power feeder 42 disposed facing each other and a membrane 43 arranged between the first power feeder 41 and the second power feeder 42.

The membrane 43 divides the electrolytic chamber 40 into a first polar chamber 40a on the side of the first power feeder 41 and a second polar chamber 40b on the side of the second power feeder 42. The membrane 43 allows ions produced in electrolysis to pass. The first power feeder 41 and the second power feeder 42 are electrically connected to each other through the membrane 43. When a direct-current voltage is applied between the first power feeder 41 and the second power feeder 42, water is electrolyzed in the electrolytic chamber 40, so that electrolyzed water is obtained.

For example, in the state illustrated in FIG. 1, the first power feeder 41 is positively charged and the first polar chamber 40a functions as an anode chamber. Meanwhile, the second power feeder 42 is negatively charged and the second polar chamber 40b functions as a cathode chamber. More specifically, a reductive electrolyzed hydrogen water in which the generated hydrogen gas is melted is generated in the second polar chamber 40b and electrolyzed acid water in which the generated oxygen gas is melted is generated in the first polar chamber 40a.

Figure 2:
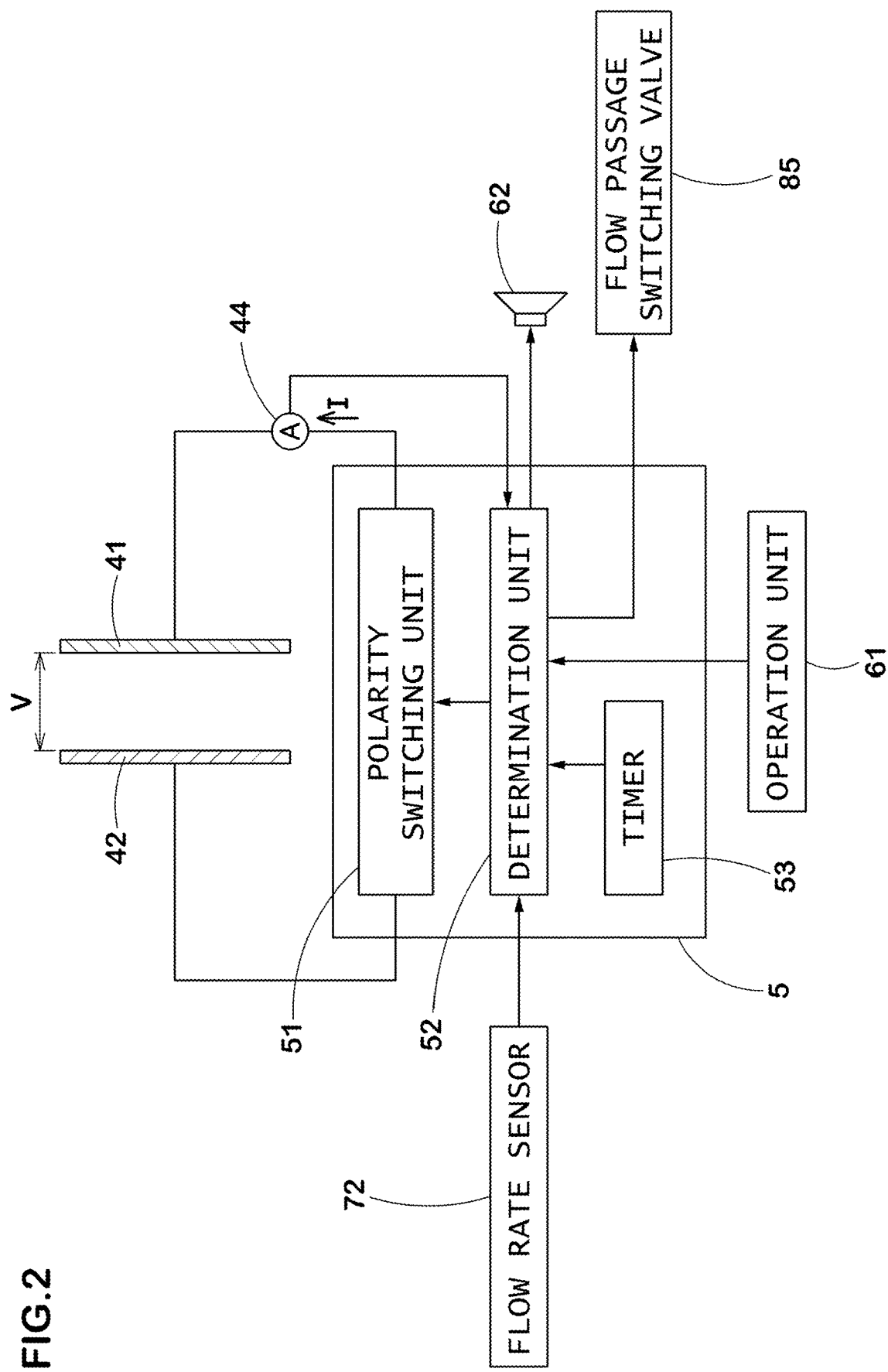
FIG. 2 a flow chart illustrating the electric configuration of the electrolyzed water generation device of FIG. 1.

FIG. 2 illustrates the electric configuration of the electrolyzed water generation device 1. The electrolyzed water generation device 1 is provided with a control unit 5 managing the control of each portion of electrolytic cell 4 and the like, for example.

The first power feeder 41, the second power feeder 42, and the control unit 5 are connected through a current supply line. On the current supply line between the first power feeder 41 and the control unit 5, a current detection unit 44 is provided. The current detection unit 44 may be provided on the current supply line between the second power feeder 42 and the control unit 5. The current detection unit 44 always or periodically detects a direct current (electrolytic current) I to be supplied to the first power feeder 41 and the second power feeder 42 and outputs an electric signal equivalent to the value to the control unit 5.

The control unit 5 controls a direct-current voltage (electrolytic voltage) v to be applied to the first power feeder 41 and the second power feeder 42 based on the electric signal output from the current detection unit 44, for example. More specifically, the control unit 5 feedback-controls a voltage v to be applied to the first power feeder 41 and the second power feeder 42 so that the current I detected by the current detection unit 44 is a desired value according to the dissolved hydrogen concentration set by a user, for example.

For example, the control unit 5 reduces the voltage v when the current I is excessively large and the control unit 5 increases the voltage v when the current I is excessively small. Thus, the current I to be supplied to the first power feeder 41 and the second power feeder 42 is appropriately controlled, so that hydrogen water of a desired dissolved hydrogen concentration is generated in the electrolytic chamber 40.

The polarities of the first power feeder 41 and the second power feeder 42 are controlled by the control unit 5. More specifically, the control unit 5 functions as a polarity switching unit 51 switching the polarities of the first power feeder 41 and the second power feeder 42. Due to the fact that the control unit 5 switches the polarities of the first power feeder 41 and the second power feeder 42 as appropriate, the opportunities for the first power feeder 41 and the second power feeder 42 to function as a anode or a cathode are equalized. Then, the power feeder functioning as the cathode before the switching of the polarity functions as the anode after the switching of the polarity and cleans scale deposited before the switching. Thus, the adhesion of scale to the first power feeder 41 and the second power feeder 42 is suppressed.

The control unit 5 has a CPU (Central Processing unit) performing various kinds of operation processing and information processing, programs controlling the operation of the CPU and a memory storing various kinds of information, for example. Various kinds of functions of the control unit 5 are realized by the CPU, the memory, and the programs.

The electrolyzed water generation device 1 operates in various kinds of operation modes under the control by the control unit 5. The operation modes of the electrolyzed water generation device 1 include a "hydrogen water mode" of generating and discharging electrolyzed hydrogen water, an "acid water mode" of generating and discharging electrolyzed acid water, and a "purified water mode" of generating and discharging purified water.

The electrolyzed water generation device 1 has an operation unit 61 to be operated by a user. The operation unit 61 is operated by a user when changing the operation modes of the electrolyzed water generation device 1, for example.

The operation unit 61 has a switch corresponding to each mode, a touch panel detecting the electrostatic capacity, or the like. A user can select water to be generated by the electrolyzed water generation device 1 by operating the operation unit 61. A user can set the dissolved hydrogen concentration of electrolyzed hydrogen water to be generated by the electrolyzed water generation device 1 by operating the operation unit 61. When the operation unit 61 is operated by a user, the operation unit 61 outputs a corresponding electric signal to the control unit 5.

As illustrated in FIG. 1, the electrolyzed water generation device 1 is further provided with a water inlet portion 7 provided on the upstream side of the electrolytic cell 4 and a water outlet portion 8 provided on the downstream side of the electrolytic cell 4.

The water inlet portion 7 has a water supply pipe 71, a flow rate sensor 72, a branching portion 73, a flow rate regulating valve 74, and the like. The water supply pipe 71 supplies water purified by the water purification cartridge 2 to the electrolytic chamber 40. The flow rate sensor 72 is provided on the water supply pipe 71. The flow rate sensor 72 periodically detects a flow rate F1 per unit time of water to be supplied to the electrolytic chamber 40 (hereinafter also simply referred to as "flow rate"), and then outputs a signal equivalent to the value to the control unit 5.

The branching portion 73 branches the water supply pipe 71 into two parts of water supply pipes 71a and 71b. The flow rate regulating valve 74 connects the water supply pipe 71a or 71b to the first polar chamber 40a or the second polar chamber 40b. The flow rate of water to be supplied to the first polar chamber 40a and the second polar chamber 40b is regulated by the flow rate regulating valve 74 under the management of the control unit 5. In this embodiment, the flow rate sensor 72 is provided on the upstream side of the branching portion 73, and therefore detects the total flow rate of the flow rate of water to be supplied to the first polar chamber 40a and the flow rate of water to be supplied to the second polar chamber 40b, i.e., first flow rate F1 of water to be supplied to the electrolytic chamber 40.

The water outlet portion 8 has a flow passage switching valve 85, a first flow passage 81, a second flow passage 82, and the like. The flow passage switching valve 85 switches the connections between the first polar chamber 40a and the second polar chamber 40b and the first flow passage 81 and the second flow passage 82.

In a tip portion of the first flow passage 81, a first water discharge port 83 is provided. The first flow passage 81 delivers electrolyzed water generated in one of the first polar chamber 40a and the second polar chamber 40b to the first water discharge port 83. Similarly, a second water discharge port 84 is provided in a tip portion of the second flow passage 82. The second flow passage 82 delivers electrolyzed water generated in the other one of the first polar chamber 40a and the second polar chamber 40b to the second water discharge port 84.

By synchronizing the switching of the polarities of the first power feeder 41 and the second power feeder 42 and the switching of the flow passage by the flow passage switching valve 85, electrolyzed water (electrolyzed hydrogen water in FIG. 1) selected by a user can be always discharged from one water discharge port (for example, first water discharge port 83).

In the switching of the polarities of the first power feeder 41 and the second power feeder 42, an aspect is desirable in which the control unit 5 interlockingly operates the flow rate regulating valve 74 and the flow passage switching valve 85. Thus, effective use of water is enabled while sufficiently securing the supply amount of water to the polar chamber connected to the first water discharge port 83 before and after the switching of the polarity and suppressing the supply amount of the water to the polar chamber connected to the second water discharge port 84. An aspect is desirable in which the flow rate regulating valve 74 and the flow passage switching valve 85 are integrally formed and are interlockingly driven by a single motor as described in Japanese Patent No. 5809208, for example. More specifically, the flow rate regulating valve 74 and the flow passage switching valve 85 are configured by an outer cylindrical body and an inner cylindrical body having a cylindrical shape or the like. In the inside and the outside of the inner cylindrical body, flow passages configuring the flow rate regulating valve 74 and the flow passage switching valve 85 are formed. The flow passages are configured so as to cross as appropriate according to the operating states of the flow rate regulating valve 74 and the flow passage switching valve 85. Such a valve device is referred to as "double autochange crossline valve" and contributes to the simplification of the configuration and the control of the electrolyzed water generation device 1 and further increases the commercial value of the electrolyzed water generation device 1.

As already described above, the electrolyzed water generation device 1 of the present invention is configured so as to switch the polarities of the first power feeder 41 and the second power feeder 42 as appropriate in order to suppress the adhesion of scale to the surfaces of the first power feeder 41 and the second power feeder 42. The switching timing of the polarities of the first power feeder 41 and the second power feeder 42 is managed by the control unit 5. Moreover, the control unit 5 controls the flow passage switching valve 85 to switch the connections between the first polar chamber 40a and the second polar chamber 40b and the first flow passage 81 and the second flow passage 82 synchronizing with the switching of the polarities of the first power feeder 41 and the second power feeder 42. More specifically, the control unit 5 functions as a determination unit 52 determining the switching timing of the polarities of the first power feeder 41 and the second power feeder 42 and the flow passage switching valve 85.

As illustrated in FIG. 2, the electrolyzed water generation device 1 is provided with a speaker 62 for outputting various kinds of sounds guiding a user's operation. The speaker 62 is controlled by the control unit 5.

In electrolyzed water discharged from the first water discharge port 83 or the like immediately after starting water supply, desired pH and dissolved gas concentration are hard to be obtained. Therefore, this electrolyzed water generation device 1 is configured so as to sound a melody from the speaker 62 after the lapse of a T1 second in which it is presumed that the pH and the dissolved gas concentration of electrolyzed water to be discharged from first water discharge port 83 are stabilized and desired electrolyzed water is obtained. The T1 is set to about several seconds, for example, according to the specification of the electrolytic chamber 40 and the length of the first flow passage 81.

In the first polar chamber 40a, the second polar chamber 40b, and the flow passage switching valve 85 immediately after switching the polarities of the first power feeder 41 and the second power feeder 42 and the flow passage switching valve 85, electrolyzed water generated with a different polarity remains. Therefore, in electrolyzed water generated immediately after switching the polarity of the second power feeder 42 and the flow passage switching valve 85, the electrolyzed water generated with a different polarity is mixed. Then, this electrolyzed water generation device 1 is configured so as to sound a melody from the speaker 62 after the lapse of a T2 (larger than T1) second in which it is presumed that the electrolyzed water generated with a different polarity is discharged from the first water discharge port 83. The T2 is set to about twice the T1, for example, according to the specification of the flow passage switching valve 85 and the length of the first flow passage 81.

The time, such as the T1 second and the T2 second, is counted by the control unit 5. More specifically, the control unit 5 has a function as a timer 53 counting the time based on a clock signal or the like. In the electrolyzed water generation device 1 of this embodiment, the time, such as the T1 second or the T2 second, is set as waiting time until desired electrolyzed water is discharged after starting water supply. By the melody sounded after the lapse of the T1 second and the T2, a user can recognize that electrolyzed water selected by operating the operation unit 61 is generated, and thus the usability of the electrolyzed water generation device 1 is increased.

FIGS. 3 and 4 are flow charts illustrating the switching operations of the polarities of the first power feeder 41 and the second power feeder 42 and the flow passage switching valve 85 in the electrolyzed water generation device 1. For the determination of the switching timing of the polarities of the power feeders 41 and 42 and the flow passage switching valve 85, a variable n equivalent to the number of times of the electrolysis after switching the polarity is used.

First, in S1, the control unit 5 resets the variable n to 0 which is an initial value. Thereafter, when the water supply is detected through the flow rate sensor 72 (Y in S3) without the operation mode being switched by a user (Y in S2), the control unit 5 applies the direct-current voltage v to the first power feeder 41 and the second power feeder 42 to start electrolysis (s4). The detection of the water supply and the stop of the water supply are determined based on a signal to be input into the control unit 5 from the flow rate sensor 72. More specifically, the flow rate sensor 72 and the control unit 5 function as water supply detection units. The control unit 5 determines that the state is in the water supply state when the flow rate in the flow rate sensor 72 exceeds the predetermined threshold value and determines that the state is in the water supply stopped state when the flow rate in the flow rate sensor 72 is less than the threshold value.

Then, when the variable n is 0 (Y in S5), the control unit 5 determines that electrolysis immediately after switching the polarities of the first power feeder 41 and the second power feeder 42 and the flow passage switching valve 85 is performed, and then causes the speaker 62 to output a melody after the lapse of the T2 seconds (s6). On the other hand, when the variable n is not 0 (N in S5), the control unit 5 causes the speaker 62 to output a melody after the lapse of the T1 second (s7).

Thereafter, when the stop of the water supply is detected through the flow rate sensor 72 (s8), the control unit 5 stops the electrolysis (s9) by stopping the application of the direct-current voltage v to the first power feeder 41 and the second power feeder 42, and then increments the variable n by 1 (s10). In the subsequent S11, it is determined whether the variable n reaches a predetermined number N (N is an integer of 2 or more). When the variable n does not reach the number N (N in S11), the process returns to S2, and then the loop to S11 is repeated. In this case, the switching of the polarity is not performed.

On the other hand, when the variable n reaches the number N (Y in S11), the control unit 5 counts the time after stopping the electrolysis (s12). Then, when a predetermined time 6T passes (Y in S15) without the switching of the operation modes and the water supply being detected (Y in S13, N in S14), the control unit 5 determines that the switching timing of the polarities of the power feeders 41 and 42 and the flow passage switching valve 85 arrives, and then switches the polarities of the power feeders 41 and 42 and the flow passage switching valve 85 (S16).

Each processing of S1 to S16 is performed while always being looped in the operation of the electrolyzed water generation device 1. More specifically, after the processing of S16 is completed, the processing of S1 is performed. More specifically, the control unit 5 switches the polarities of the power feeders 41 and 42 and the flow passage switching valve 85 in S16 to prepare for the detection (s3) of water supply by the flow rate sensor 72 of the next loop. Thus, the power feeder functioning as a cathode to generate electrolyzed hydrogen water in the last loop functions as an anode to clean a deposited scale. Therefore, due to the repetition of such a loop, the electrolyzed hydrogen water generation step and the scale cleaning step are alternately repeated, so that the adhesion of scale to the surfaces of the first power feeder 41 and the second power feeder 42 is continuously suppressed.

When the operation modes are switched by a user in S2 and S13 above (N in S2, N is S13), the process shifts to S21, and the control unit 5 switches the flow passage switching valve 85. Then, when the water supply is detected through the flow rate sensor 72 (Y in S22), the direct-current voltage V is applied to the first power feeder 41 and the second power feeder 42 to start electrolysis (s23). Thereafter, the control unit 5 resets the variable n to 0, and then shifts to S5. Moreover, when the operation mode is switched to the purified water mode in S2 (N in S2), purified water generated by the water purification cartridge 2 may be supplied through the first polar chamber 40a or the second polar chamber 40b without being electrolyzed, and therefore S21 and S23 are skipped.

Furthermore, when the water supply is detected by the flow rate sensor 72 (Y in S14) in S14 above, the control unit 5 applies the direct-current voltage V to the first power feeder 41 and the second power feeder 42 to start electrolysis (s31), and then causes the speaker 62 to output a melody after the lapse of the T1 second (s32). Thereafter, when the stop of the water supply is detected through the flow rate sensor 72 (s33), the control unit 5 stops the application of the direct-current voltage V to the first power feeder 41 and the second power feeder 42 to thereby stop the electrolysis (s34), resets the counted time (s35), and then returns to S12. In this case, the switching of the polarity is not performed.

As illustrated in S2 to S11 of FIG. 3, in this electrolyzed water generation device 1, the control unit 5 determines the switching timing on the assumption that electrolysis is performed by the predetermined number of times N or more in the electrolytic chamber 40 without the polarities of the power feeders 41 and 42 being switched. Thus, by managing the switching of the polarity based on the number of times in which the electrolysis is performed, the adhesion of scale to the first power feeder 41 and the second power feeder 42 can be suppressed.

Furthermore, in this electrolyzed water generation device 1, the control unit 5 determines that the switching timing arrives when the predetermined time 6T passes without detecting the water supply to the electrolytic chamber after the electrolysis is performed by the number of times N or more as illustrated in S12 to S15 of FIG. 4. Therefore, when water is supplied to the electrolytic chamber 40 several times for a short period of time during cooking, for example (Y in S14), the switching of the polarity is not performed during that time. In connection therewith, the waiting time until desired electrolyzed water is discharged without shifting to each processing from S1 to S6 in the next loop is maintained at the T1 second (s32). Therefore, the occurrence frequency of the situation in which the waiting time is prolonged from the T1 second to the T2 second in connection with the switching of the polarity decreases, so that the usability of the electrolyzed water generation device 1 is further increased.

The flow passage switching valve 85 is driven by a motor, for example. The switching of such a flow passage switching valve 85 is accompanied by the operation sound of the motor. This embodiment can be configured so that the flow passage switching valve 85 is switched during the time in which it can be presumed that a user moves to a place distant from the electrolyzed water generation device 1 by defining the time 6T as appropriate (for example, about several minutes to about ten and several minutes). Thus, a user is prevented from being bothered with the operation sound of the motor.

The electrolyzed water generation device 1 of the present invention may be configured so that the control unit 5 determines the switching timing based on the integrated time of electrolysis in addition to the number of times of electrolysis after the switching of the polarity and the time after stopping electrolysis described above (AND conditions). In this case, the control unit 5 integrates the electrolysis time in the electrolytic chamber 40. The control unit 5 determines that the switching timing arrives when the integrated electrolysis time reaches the predetermined threshold value without the polarities of the first power feeder 41 and the second power feeder 42 being switched. When the operation mode is switched and the polarity is switched before the control unit 5 determines the arrival of the switching timing, the integrated value of the electrolysis time is reset to 0. According to the configuration in which the switching timing of the polarity is determined considering the integrated time of electrolysis, the frequency of switching the polarity can be reduced with higher accuracy while suppressing the adhesion of scale, so that the usability of the electrolyzed water generation device 1 can be increased and discarded water can be reduced.

It may be configured so that the determination of the switching timing based on the integrated time of electrolysis is operated by the determination based on the number of times of electrolysis after the switching of the polarity and the time after stopping electrolysis and OR conditions. In this case, the adhesion of scale can be much more effectively suppressed.

The current I to be supplied to the first power feeder 41 and the second power feeder 42 is dependent on the flow rate per unit time detected by the flow rate sensor 72. Moreover, the current I is dependent on the dissolved hydrogen concentration set by a user. More specifically, the control unit 5 controls the voltage V to be applied to the first power feeder 41 and the second power feeder 42 so that the current I becomes larger with an increase in the flow rate per unit time of water to be supplied to the electrolytic cell 4. Moreover, the control unit 5 controls the voltage V to be applied to the first power feeder 41 and the second power feeder 42 so that the current I becomes larger when the dissolved hydrogen concentration is set to be higher. In general, the deposited amount of scale is proportional to the time in which the current I and the electrolysis are performed.

Then, this embodiment may be configured so that the control unit 5 changes the number of times N serving as the threshold value and the time 6T based on the integrated value of the currents I (time integrated value of the currents I) to be supplied to the power feeders 41 and 42 after switching the polarities of the power feeders 41 and 42 and the flow passage switching valve 85. The control unit 5 calculates the integrated value of the currents I based on an electric signal output from the current detection unit 44.

Then, when the integrated value of the currents I after switching the polarities of the power feeders 41 and 42 and the flow passage switching valve 85 is smaller than the predetermined threshold value, for example, it can be presumed that the deposited amount of scale is relatively small to the number of times of electrolysis. Therefore, by setting the number of times N serving as the threshold value to be large or setting the time 6T to be large, the frequency of switching the polarity can be reduced, so that the usability of the electrolyzed water generation device 1 can be increased. On the other hand, when the integrated value of the currents I after switching the polarities of the power feeders 41 and 42 and the flow passage switching valve 85 is larger than the predetermined threshold value, it can be presumed that the deposited amount of scale is relatively large to the number of times of electrolysis. Therefore, the frequency of switching the polarity can be reduced by setting the number of times N serving as the threshold value to be small or setting the time 6T to be small. Therefore, by changing the number of times N and the time 6T based on the integrated value of the currents I after switching the polarities of the power feeders 41 and 42 and the flow passage switching valve 85, the switching timing can be much more accurately managed.

The deposited amount of scale is dependent on the components of water to be supplied to the electrolytic chamber 40. When water containing a large amount of mineral components, such as calcium, is supplied to the electrolytic chamber 40, the deposited amount of scale tends to increase. The water containing a large amount of the mineral components has a small resistance value, and therefore the current I corresponding to the flow rate and a desired dissolved hydrogen water concentration is obtained at a relatively low voltage V.

Then, this embodiment may be configured so that the control unit 5 changes the number of times N serving as the threshold value and the time 6T based on the ratio v/I of the voltage V to be applied to the power feeders 41 and 42 to the current I to be supplied thereto after switching the polarities of the power feeders 41 and 42 and the flow passage switching valve 85. In this case, the control unit 5 functions as a voltage detection unit always or periodically detecting the voltage V to be feedback-controlled. The ratio v/I is calculated by the control unit 5 based on an electric signal output from the current detection unit 44 and the voltage V. For example, the control unit 5 calculates the ratio v/I by periodically detecting the voltage V to be applied to the power feeders 41 and 42 and the current I to be supplied thereto and further calculates the average value thereof. Thus, the control unit 5 can automatically adjust the frequency of switching the polarity and the flow passage switching valve 85 according to the water quality of an area where the electrolyzed water generation device 1 is to be used.

More specifically, when the average value of the ratio v/I after switching the polarities of the power feeders 41 and 42 and the flow passage switching valve 85 is smaller than the predetermined threshold value, it can be presumed that the deposited amount of scale is relatively large to the number of times of electrolysis. Therefore, by setting the number of times N serving as the threshold value to be small and the time 6T to be small, the frequency of switching the polarity can be increased to suppress the adhesion of scale. On the other hand, when the average value of the ratio v/I after switching the polarities of the power feeders 41 and 42 and the flow passage switching valve 85 is larger than the predetermined threshold value, it can be presumed that the deposited amount of scale is relatively small to the number of times of electrolysis. Therefore, by setting the number of times N serving as the threshold value to be large and setting the time 6T to be large, the frequency of switching the polarity can be reduced and the usability of the electrolyzed water generation device 1 can be increased.

As described above, the electrolyzed water generation device 1 of the present invention is described in detail but the present invention is altered to various aspects to be implemented without being limited to the specific embodiment described above. More specifically, the electrolyzed water generation device 1 may be configured so as to be provided with at least the electrolytic chamber 40 to which water to be electrolyzed is supplied, the first power feeder 41 and the second power feeder 42 disposed facing each other in the electrolytic chamber 40, and the membrane 43 arranged between the first power feeder 41 and the second power feeder 42 and dividing the electrolytic chamber 40 into the first polar chamber 40a on the side of the first power feeder 41 and the second polar chamber 40b on the side of the second power feeder 42 and to be further provided with the first flow passage 81 delivering electrolyzed water generated in one of the first polar chamber 40a and the second polar chamber 40b to the first water discharge port 83, the second flow passage 82 delivering electrolyzed water generated in the other one of the first polar chamber 40a and the second polar chamber 40b to the second water discharge port 84, the flow passage switching valve 85 switching the connections between the first polar chamber 40a and the second polar chamber 40b and the first flow passage 81 and the second flow passage 82, the polarity switching unit 51 switching the polarities of the first power feeder 41 and the second power feeder 42, the determination unit 52 determining the switching timing of the polarity switching unit 51 and the flow passage switching valve 85, and the flow rate sensor 72 detecting the water supply to the electrolytic chamber 40 and configured so that the determination unit 52 determines that the switching timing arrives when the predetermined time passes without the flow rate sensor 72 detecting the water supply to the electrolytic chamber 40 after electrolysis is performed by the predetermined number of times or more in the electrolytic chamber 40 without the polarity being switched.

DESCRIPTION OF REFERENCE SIGNS

1 electrolyzed water generation device
5 control unit
40 electrolytic chamber
40a first polar chamber
40b second polar chamber
41 first power feeder
42 second power feeder
43 membrane
44 current detection unit
51 polarity switching unit
52 determination unit
72 flow rate sensor (water supply detection unit)
81 first flow passage
82 second flow passage
83 first water discharge port
84 second water discharge port
85 flow passage switching valve

The invention claimed is:
1. An electrolyzed water generation device comprising:
an electrolytic chamber to which water to be electrolyzed is supplied;
a first power feeder and a second power feeder disposed facing each other in the electrolytic chamber; and
a membrane arranged between the first power feeder and the second power feeder and dividing the electrolytic chamber into a first polar chamber on a side of the first power feeder and a second polar chamber on a side of the second power feeder, characterized in that
the electrolyzed water generation device further comprises:
a first flow passage delivering electrolyzed water generated in one of the first polar chamber and the second polar chamber to a first water discharge port;
a second flow passage delivering electrolyzed water generated in another one of the first polar chamber and the second polar chamber to a second water discharge port;
a flow passage switching valve switching connections of the first polar chamber and the second polar chamber to the first flow passage and the second flow passage;

a polarity switching unit switching polarities of the first power feeder and the second power feeder;
a determination unit determining switching timing of the polarity switching unit and the flow passage switching valve; and
a water supply detection unit detecting water supply to the electrolytic chamber, and wherein
the determination unit is programmed to determine that the switching timing arrives when a predetermined time passes without the water supply detection unit detecting water supply to the electrolytic chamber after electrolysis is performed by a predetermined number of times or more in the electrolytic chamber without the polarities being switched.

2. The electrolyzed water generation device according to claim 1, wherein
the determination unit is programmed to
integrate electrolysis time in the electrolytic chamber and
determine that the switching timing arrives when said time passes after the electrolysis is performed by said number of times or more in the electrolytic chamber without the polarities being switched and the integrated electrolysis time reaches a predetermined threshold value.

3. The electrolyzed water generation device according to claim 1 further comprising:
a current detection unit detecting a current to be supplied to the first power feeder and the second power feeder, wherein
the determination unit is programmed to change said number of times based on on an integrated value of the currents after switching the polarity and the flow passage.

4. The electrolyzed water generation device according to claim 3, wherein
the determination unit is programmed to change said time based on said integrated value of the currents after switching the polarity and the flow passage.

5. The electrolyzed water generation device according to claim 3 further comprising:
a voltage detection unit detecting a voltage to be applied to the first power feeder and the second power feeder, wherein
the determination unit is programmed to change said number of times based on a ratio of the voltage to the current after switching the polarity and the flow passage.

6. The electrolyzed water generation device according to claim 5, wherein
the determination unit is programmed to change said time based on the ratio of the voltage to the current.

7. The electrolyzed water generation device according to claim 1, further comprising:
a speaker that outputs sound, wherein
the electrolyzed water generation device is configured to sound a melody from the speaker after a T1 second lapses, which is counted immediately after starting to supply the electrolyzed water, wherein the T1 second is presumed during which pH and the dissolved gas concentration of the electrolyzed water to be discharged from the first water discharge port becomes stabilized and desired electrolyzed water is obtained.

8. The electrolyzed water generation device according to claim 1, further comprising:
a speaker that outputs sound, wherein
the electrolyzed water generation device is configured to sound a melody from the speaker after a T2 second lapses, which is counted immediately after
the polarity switching unit switches the polarities of the first power feeder and the second power feeder wherein the polarities are defined to be switched from a previous polarity to a current polarity, and
the flow passage switching valve switches the connections of the first polar chamber and the second polar chamber, wherein
the T2 second is presumed during which the electrolyzed water generated with the previous polarity is fully discharged from the first water discharge port and the second water discharge port.

9. The electrolyzed water generation device according to claim 7, further comprising:
a speaker that outputs sound, wherein
the electrolyzed water generation device is configured to sound a melody from the speaker after a T2 second lapses, which is counted immediately after
the polarity switching unit switches the polarities of the first power feeder and the second power feeder wherein the polarities are defined to be switched from a previous polarity to a current polarity, and
the flow passage switching valve switches the connections of the first polar chamber and the second polar chamber, wherein
the T2 second is greater than the T1 second, and
the T2 second is presumed during which the electrolyzed water generated with the previous polarity is fully discharged from the first water discharge port and the second water discharge port.

* * * * *